US008461453B2

(12) United States Patent  (10) Patent No.: US 8,461,453 B2
Puccini  (45) Date of Patent: Jun. 11, 2013

(54) WIND TURBINE WIRING ENCLOSURE CABINET

(75) Inventor: Kevin F. Puccini, Cincinnati, OH (US)

(73) Assignee: Connector Manufacturing Company, Hamilton, OH (US)

( * ) Notice: Subject to any disclaimer, the term of this patent is extended or adjusted under 35 U.S.C. 154(b) by 647 days.

(21) Appl. No.: 12/321,848

(22) Filed: Jan. 27, 2009

(65) Prior Publication Data

US 2010/0186985 A1    Jul. 29, 2010

(51) Int. Cl.
H01R 13/46 (2006.01)
H02G 3/18 (2006.01)
H05K 7/02 (2006.01)

(52) U.S. Cl.
USPC .................. 174/59; 174/60; 174/541

(58) Field of Classification Search
USPC .............. D13/152; 175/50, 59; 174/50, 59, 174/541, 60
See application file for complete search history.

(56) References Cited

U.S. PATENT DOCUMENTS

| | | | | |
|---|---|---|---|---|
| 1,775,694 | A * | 9/1930 | Rah | 174/59 |
| 1,844,125 | A * | 2/1932 | Kelsay | 174/60 |
| 2,014,586 | A * | 9/1935 | Rah | 174/5 R |
| 2,359,247 | A * | 9/1944 | Rowe | 361/608 |
| 2,492,739 | A * | 12/1949 | Gallaher | 361/642 |
| 3,836,269 | A * | 9/1974 | Koscik | 403/197 |
| 4,050,770 | A * | 9/1977 | Rigo | 439/718 |
| 4,079,439 | A | 3/1978 | Coles et al. | |
| 4,517,623 | A | 5/1985 | Barner et al. | |
| 5,071,143 | A | 12/1991 | Byerly | |
| 5,422,436 | A * | 6/1995 | Zachrai | 174/666 |
| 5,568,362 | A | 10/1996 | Hanson | |
| 5,573,321 | A | 11/1996 | Bell, Jr. | |
| 5,725,185 | A * | 3/1998 | Auclair | 248/74.2 |
| 5,745,337 | A | 4/1998 | Reiner | |
| 5,835,354 | A * | 11/1998 | Bug et al. | 361/736 |
| 6,005,188 | A * | 12/1999 | Teichler et al. | 174/50 |
| 6,266,471 | B1 * | 7/2001 | Burek et al. | 385/137 |
| 6,291,767 | B1 * | 9/2001 | Beecher et al. | 174/50 |
| 6,549,428 | B1 * | 4/2003 | Fontana et al. | 361/825 |
| 7,492,621 | B2 * | 2/2009 | Wobben | 363/144 |
| 7,737,360 | B2 | 6/2010 | Wiemeyer et al. | |
| 7,825,333 | B2 * | 11/2010 | Puccini | 174/50 |
| 2003/0182881 | A1 * | 10/2003 | Denier et al. | 52/220.7 |
| 2004/0112623 | A1 * | 6/2004 | L+Henaff et al. | 174/59 |
| 2008/0236886 | A1 * | 10/2008 | Gerull et al. | 174/535 |
| 2008/0244990 | A1 * | 10/2008 | Puccini | 52/63 |
| 2010/0186981 | A1 * | 7/2010 | Thomas et al. | 174/50 |
| 2010/0186984 | A1 * | 7/2010 | Puccini | 174/59 |
| 2010/0218797 | A1 * | 9/2010 | Coyle et al. | 136/243 |

* cited by examiner

Primary Examiner — Timothy Thompson
Assistant Examiner — Nathan Milakovich
(74) Attorney, Agent, or Firm — Holland & Knight LLP; John P. Moran, Esq.

(57) ABSTRACT

A wind turbine wiring enclosure cabinet that includes a housing and an electrical circuit connector. The housing includes a top surface with a plurality of apertures formed therein, and a sidewall in contact therewith. The housing also has an interior accessed by a door in the sidewall. The electrical circuit connector includes at least one non-conductive beam attached to the sidewall, and a plurality of conductive elements connectable to respective electrical connectors, with the plurality of conductive elements attached to the non-conductive beam. The housing preferably includes a bottom member having a plurality of apertures formed therein, located below the electrical circuit connector and attached to the sidewall.

20 Claims, 4 Drawing Sheets

WIND TURBINE WIRING ENCLOSURE CABINET

BACKGROUND OF THE INVENTION

1. Field of the Invention

This invention relates generally to wind turbines, and more particularly, to a cabinet that can be installed inside the vertical tower of a wind turbine in conjunction with already installed wiring to retrofit the wiring assembly of the wind turbine.

2. Description of the Related Art

This invention is directed to the providing of an electrical cabinet to enclose the joined cables associated with wind turbines. Wind turbines are sometimes referred to as windmills, but the power generated by them is many times that of the windmills seen on rural farms in the twentieth century. Modern wind turbines can be over 200 feet high and provide over 2.5 megawatts of electricity. The newer, taller type of wind turbines are being touted as one way to reduce dependence on oil, while at the same time reducing air pollution.

One problem associated with wind turbines is caused by their height. While taller turbines can produce more electricity due to the air currents several hundred feet above ground, the energy that is harnessed by the blades must be transmitted downwardly through the interior of the structure by way of wire cables. Due to the size and weight of these cables, each cable pathway is created by attaching a plurality of cables to one another in series. Furthermore, there are typically several (i.e. 3-5) cables secured to one another, so for example if 18 cables descend from the top to the bottom of a wind turbine tower, they are typically bundled in three groups of 5 cables and one group of 3 cables.

The prior art of wind turbines typically has had each individual cable attached to the next adjacent cable above or below it by means of a copper compression splice, with one end of the compression splice in direct contact with the cable descending from above the splice and with the other end of the compression splice in direct contact with the cable that descends below the copper compression splice. The area of the splice in then typically wrapped with a plastic sheet-form member to theoretically provide some degree of insulation.

This means of attachment results in a significant amount of heat being generated at the site of the splice, which in turn is detrimental to the electrical circuit. Due to the type of splice used to connect the adjacent wire cables in the prior art, the circuits had a tendency to break down, which associated with unintentionally redistributing the electrical power into the remaining cables, caused the other downwardly extending cables within the tower to undergo greater stress than was originally intended. Consequently, this stress could cause other of the remaining cables to degrade.

Additionally, in the prior art of wind turbines, the cables were secured directly to the interior of the turbine wall. Consequently, individuals performing maintenance inside the turbine tower had to be extremely careful about not coming into contact with the splice sites, lest electrocution possibly occur. Despite the high levels of electricity carried through each set of vertically depending cables, the safety situation is obviously questionable, yet a solution to this long-felt need has heretofore been found.

It is thus apparent that the need exists for a better way to join the wire cables used in wind turbines, and for a way to keep persons inside the tower of the wind turbine safer as it relates to the current flowing through the wire cables. Furthermore, the solution to this existing problem should be relatively easy and cost effective to fabricate and install.

SUMMARY OF THE INVENTION

In accordance with the present invention, there is disclosed a wind turbine wiring enclosure cabinet having a housing and an electrical circuit connection means. The housing has a top surface, a sidewall in contact with the top surface, and with the top surface having a plurality of apertures formed therein. The housing also has an interior, with the sidewall having a door accessing the interior. The electrical circuit connection means includes at least one non-conductive beam attached to the sidewall, and a plurality of conductive elements each having a top portion and a bottom portion. The top portion of each conductive element has connected thereto at least one electrical connector, with the plurality of conductive elements attached to the non-conductive beam.

Preferably, the conductive elements are attached to the non-conductive beam by non-conductive attachment means. Each non-conductive attachment means has a first portion in contact with at least one non-conductive beam and a second portion in contact with at least one of the conductive elements. The apertures formed in the top surface of the housing are preferably arranged in a plurality of groups. The housing includes a bottom member, with the bottom member being attached to the housing sidewall. The bottom member also has a plurality of apertures formed therein, with the bottom member being located below the electrical circuit connection means. The apertures formed in the bottom member preferably are arranged in a plurality of groups. Each aperture in the top surface has associated therewith and in contacting relationship thereto a plastic grommet. Each aperture in the bottom member also preferably has associated therewith in contacting relationship thereto a plastic grommet. Preferably, the electrical circuit connection means includes two non-conductive beams. Each non-conductive beam has two ends, each of which ends is attached to said housing sidewall. Furthermore, the housing has a rear sidewall portion, with the electrical circuit connection means being located in the interior of the housing intermediate the rear sidewall portion and the door.

There is also disclosed a wind turbine wiring enclosure cabinet having a housing and an electrical circuit connection means. The housing has a top surface, a sidewall in contact with the top surface, with the top surface having a plurality of apertures formed therein. The housing also has an interior, with the sidewall having a door accessing the interior.

The electrical circuit connection means includes at least two non-conductive beams, a plurality of conductive elements each having a top portion and a bottom portion, with each top portion having connected thereto at least one electrical connector, and with each bottom portion having connected thereto at least another electrical connector. The non-conductive beams are attached to the sidewall, and each of the plurality of conductive elements are attached to at least two of the non-conductive beams.

Preferably, the conductive elements are attached to the non-conductive beam by non-conductive attachment means. Each of the non-conductive attachment means has a first portion in contact with at least one non-conductive beam and a second portion in contact with at least one of the conductive elements. The housing includes a bottom member attached to the housing sidewall, with the bottom member being located below the electrical circuit connection means. The apertures formed in the top surface are preferably arranged in a plurality of groups and the bottom member has a plurality of apertures formed therein, with the apertures formed in the bottom member also preferably arranged in a plurality of groups.

Each non-conductive beam has two ends, with each of the ends preferably being attached to the housing sidewall. said housing has a rear sidewall portion, said electrical circuit connection means being located in said interior of said housing intermediate said rear sidewall portion and said door.

There is also disclosed a wind turbine wiring enclosure cabinet having a housing and an electrical circuit connection means. The housing has a top surface, a sidewall in contact with the top surface, with the sidewall having a pair of opposed surfaces and a rear wall section intermediate the pair of opposed surfaces. The top surface has a plurality of apertures formed therein. The housing having an interior, with the sidewall having a door accessing the interior.

The electrical circuit connection means includes at least one non-conductive beam, a plurality of conductive elements each having a top portion and a bottom portion, with each top portion having connected thereto at least one electrical connector, and each bottom portion having connected thereto at least another electrical connector. Each non-conductive beam has a first end portion and a second end portion, with the first end portion being attached to one of the opposed surfaces of the sidewall and the second end portion being attached to the other of the opposed surfaces of the sidewall. Each of the plurality of conductive elements are attached to at least one non-conductive beam. Preferably the conductive elements are attached to the non-conductive beam by non-conductive attachment means. Also, preferably the electrical circuit connection means has at least two non-conductive beams.

The primary objective of this invention is to provide a better way to join the wire cables used in wind turbines so that the degradation of the electrical circuits inside the tower of the wind turbine is significantly lessened.

Another objective of this invention is to provide such a device that keeps persons inside the tower of the wind turbine safer when they are around the wire cables, given the current flowing therethrough.

Still another objective is to provide such a device that is relatively easy to install in existing wind turbine towers so as to retrofit the tower, thereby minimizing electrical circuit degradation and enhancing safety.

Other objects and advantages of the invention will be apparent from the following description, the accompanying drawings and the appended claims.

Figure 1:
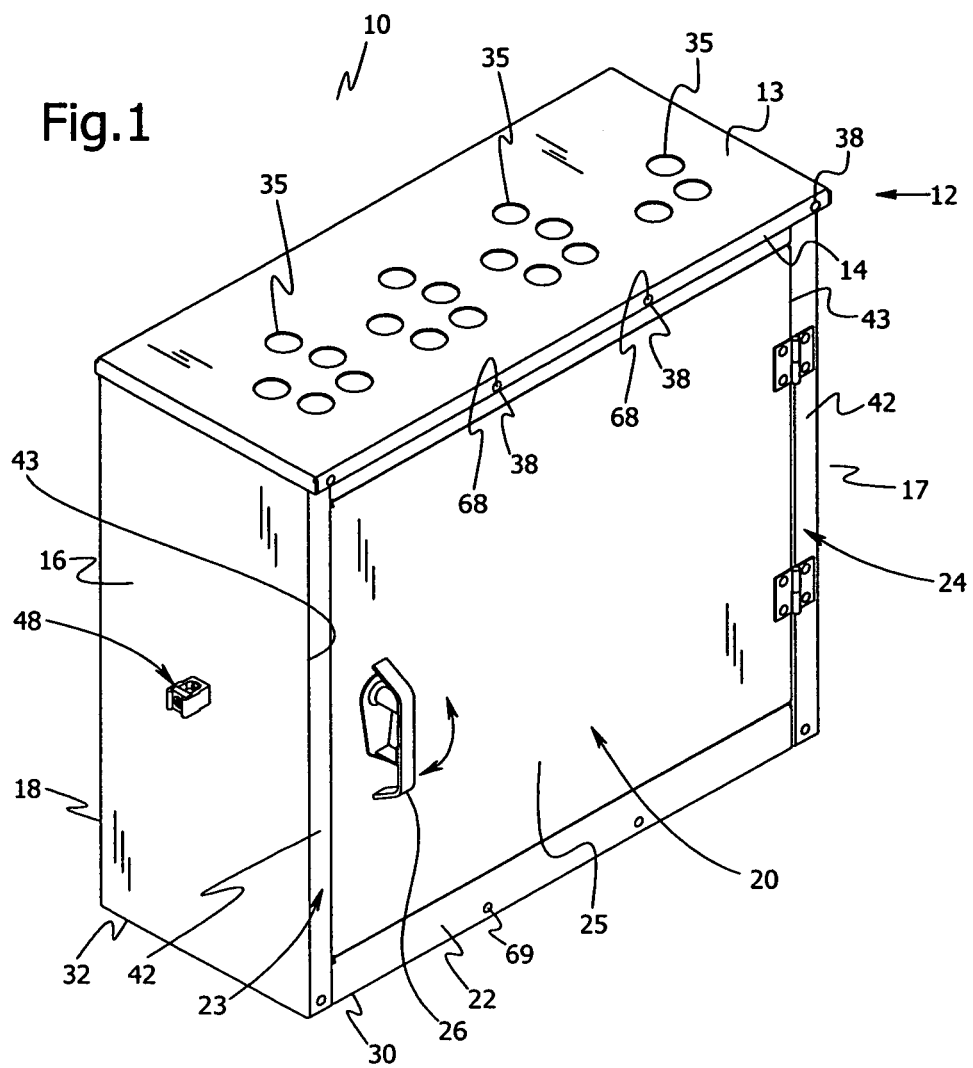
FIG. 1 is a perspective view of a wind turbine wiring enclosure cabinet made in accordance with this invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

This invention addresses the above limitations associated with prior art wind turbines resulting in a wind turbine wiring enclosure cabinet that can especially be utilized in already erected wind turbines. Erected wind turbines comprise several floors within the tower of the structure, with each floor level having a hatch or door mechanism formed in the floor to enable access to higher floor levels. By opening these hatches, the components of the wiring enclosure cabinet can be passed through the openings in the floor, until the cabinet components have reached their desired height, at which point they can be assembled into the cabinet structure for subsequent attachment to the wall of the tower preferably by means of a bracket member.

Having reference to the drawings, attention is directed first to FIG. 1, which discloses an assembled wind turbine wiring enclosure cabinet made in accordance with this invention and designated generally by the numeral 10. The wind turbine wiring enclosure cabinet 10 can be appreciated as having a housing 12 serving as the external walls of the cabinet. The housing 12 has a top 13 that typically is of a rectangular shape. The top is generally planar, and extending downwardly from the upper surface of the top is top flange 14, so that the top 13 resembles a lid that rests atop the sidewalls of the cabinet. The top flange 14 has a top flange inner wall 15 that rests directly adjacent the housing sidewall.

The sidewall in the preferred embodiment of the invention has four sides, but the shape is not critical, as long as the electrical components of the invention can be assembled in the interior of the cabinet. In the embodiment where there are essentially four sides to the cabinet, the cabinet has a sidewall 16, a sidewall 17 on the opposite side of the cabinet 10, a rear wall 18 and front wall 20, the rear wall 18 having formed therein at least one and preferably a plurality of rear wall apertures 19 which permit the cabinet to be secured to the wind turbine's interior wall in a manner not pertinent to this particular invention.

Figure 3:
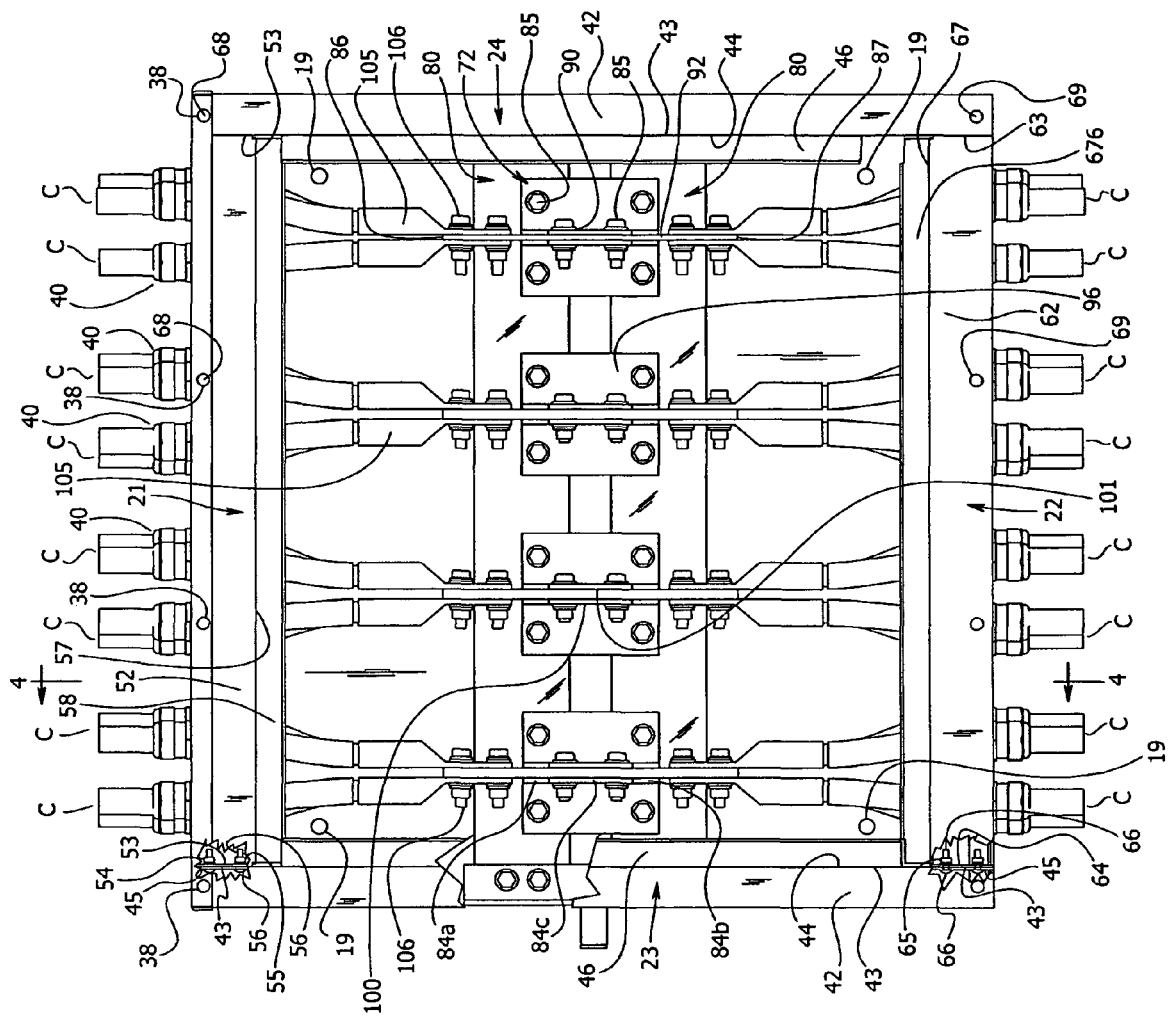
FIG. 3 is a front elevational view of the invention with the door removed, with the invention shown in use.

As can be appreciated from a comparison of FIGS. 1 and 3, the front wall 20 features an upper horizontal component 21, a lower horizontal component 22, a first vertical portion 23, and a second vertical portion 24. The upper horizontal component 21, lower horizontal component 22, first vertical portion 23, and second vertical portion 24 surround door 25. The door 25 has a handle 26 protected by a handle cover 28 of the type well known in the art. The three point latching mechanism associated with the handle is also of the type well known in the art of electrical cabinets, however the type of handle and latching mechanism is not important to the invention itself. The cabinet also has a bottom 30 with a lower edge 32. The first and second vertical portions 23 and 24 respectively extend from the bottom to the top of the cabinet, and the horizontal components extend substantially the distance between the sidewalls 16 and 17.

Figure 2:
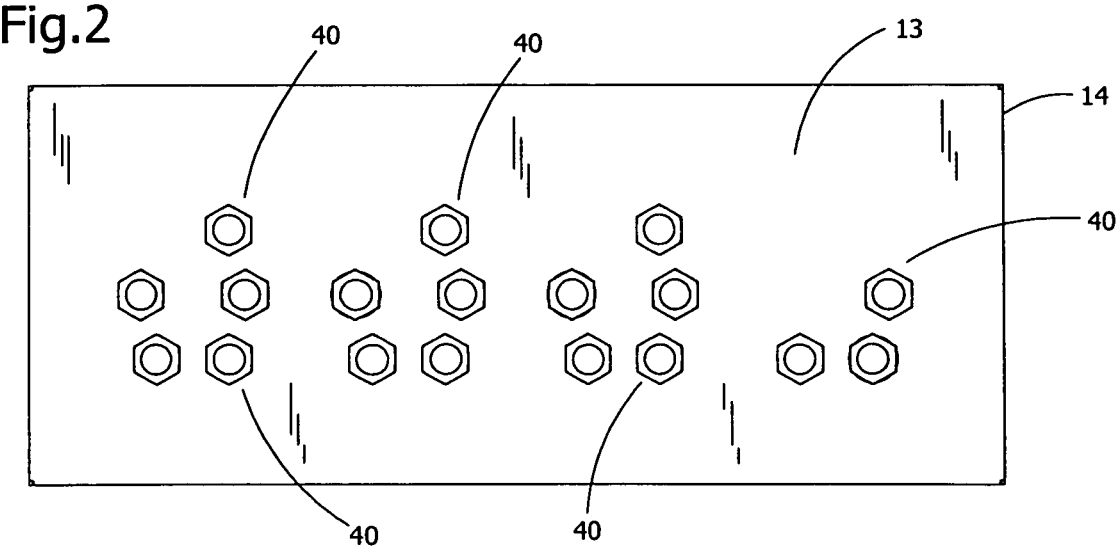
FIG. 2 is a top plan view of the invention similar to that shown in FIG. 1, but showing the top in its operative condition.

As can be appreciated from a comparison of FIGS. 1-3, the top 13 has formed therein a plurality of top apertures 35. Similarly, the top flange 14 has a plurality of top attachment apertures 38 formed therein to facilitate the securing of the top to the sidewall of the cabinet 10. The top apertures 35 accommodate plastic grommets 40, known in the art as PGs, through which the electric cables of the wind turbine pass. These PGs typically have at least six sides and can often have an aperture size of 1" or more aligned with the top apertures.

Figure 4:
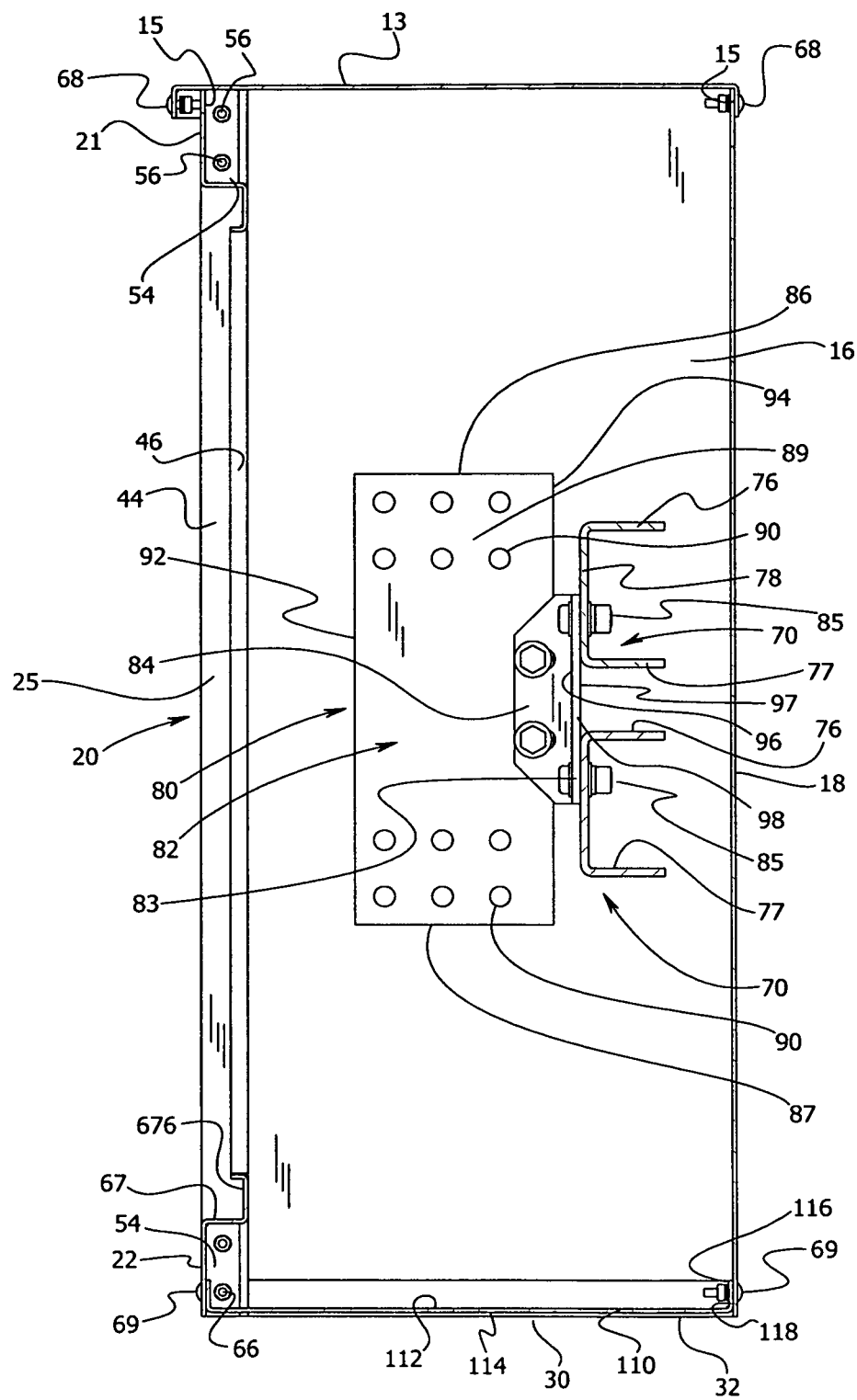
FIG. 4 is a vertical sectional view taken along line 4-4 of FIG. 3.

As can be appreciated from a comparison of FIGS. 1, 3 and 4, the first and second vertical portions 23 and 24 each have an exterior surface 42 facing out from the front of the cabinet 10, an inner edge 43 directly adjacent the side edges of the door 25, and an inwardly extending flange 44 which extends rearwardly from the inner edge 43. Near the top and bottom of each of the inwardly extending flanges preferably are at least two inwardly Extending flange apertures 45. At the rear edge of the inwardly extending flange, a vertical doorstop portion 46 extends parallel to the exterior surface, but behind the closed door to prevent the door from swinging into the interior of the cabinet. On the exterior of one sidewall 16, a lay-in lug assembly 48 is attached for passage therethrough of the ground wire for the wind turbine.

The upper horizontal component 21 that extends between the vertical portions on the front of the cabinet has an exterior surface 52. The upper horizontal component has two outer edges 53, each of which is directly adjacent either the first or second vertical portion. The upper horizontal component 21 also has a pair of inwardly extending side flanges 54 at the opposite ends thereof, each of which extends rearwardly from the respective outer edge of the exterior surface 52 and preferably has formed therein inwardly extending side flange apertures 55.

Fastening means 56 pass through the apertures 55 of the upper horizontal component and apertures 45 of the directly adjacent vertical portion. Similarly, extending inwardly from the bottom edge of the exterior surface of the upper horizontal component is a top inwardly extending horizontal flange 57. Extending downwardly from the back edge of the inwardly extending horizontal flange 57 is a top horizontal door stop portion 58, which extends parallel to the upper horizontal component's exterior surface 52, but behind the closed door to prevent the door from swinging into the interior of the cabinet.

The lower horizontal component 22 that extends between the vertical portions on the front of the cabinet also has an exterior surface 62. The lower horizontal component has two outer edges 63, each of which is directly adjacent either the first or second vertical portion. The lower horizontal component 22 also has a pair of inwardly extending side flanges 64 at the opposite ends thereof, each of which extends rearwardly from the respective outer edge of the exterior surface 62 and preferably has formed therein inwardly extending side flange apertures 65.

Fastening means 66 pass through the apertures 65 of the lower horizontal component and apertures 45 of the directly adjacent vertical portion. Similarly, extending inwardly from the top edge of the exterior surface of the lower horizontal component is a top inwardly extending lower horizontal flange 67. Extending upwardly from the back edge of the inwardly extending horizontal flange 67 is a lower horizontal door stop portion 67b, which extends parallel to the lower horizontal component's exterior surface 62, but behind the closed door to prevent the door from swinging into the interior of the cabinet.

Top fastening means 68 pass through the apertures in the top 13, as well as the apertures in the upper horizontal component 21 and the sidewalls 16, 17, and the rear wall 18 to secure the top to the lower portion of the cabinet. Additionally, bottom fastening means 69 pass through the apertures in the lower horizontal component, the sidewalls, and the rear wall to secure the bottom member 110 of the cabinet to the cabinet wall.

Figure 5:
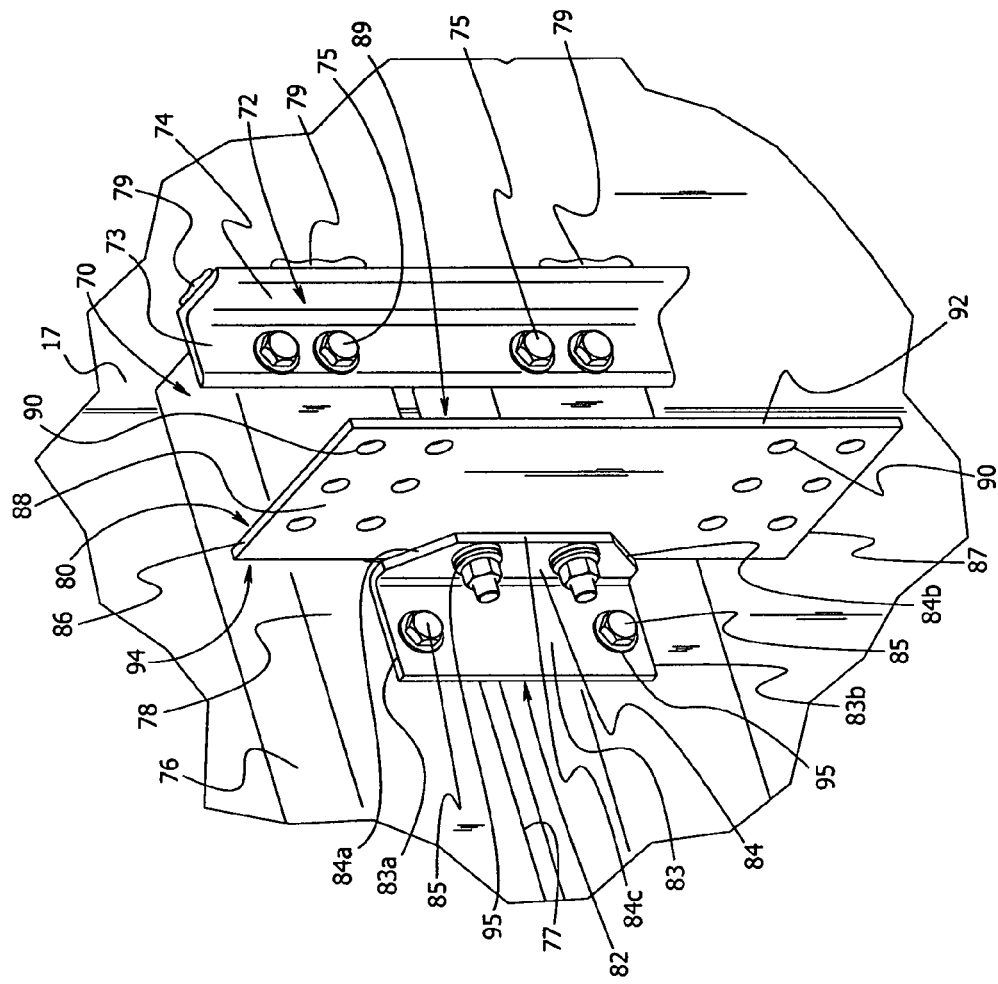
FIG. 5 is a perspective view on a greatly enlarged scale of a portion of the electrical circuit connection means component of the invention.

As can best be appreciated from a comparison of FIGS. 3, 4, and 5, electrical circuit connection means 60 are located in the interior of the cabinet. The electrical circuit connection means 60 has at least one and preferably two insulated cross beams 70, and a cross beam attachment means 72 for securing each cross beam to the sidewall of the cabinet. The cross beam attachment means is shown having a first surface 73 that extends directly adjacent the cross beam, and a second surface 74 that extends directly adjacent either sidewall 16 or 17 and permits the connection of the cross beam attachment means to the sidewall preferably by welding at weld 79 although other methods of attachment could be used. Similarly, the cross beam is attached to the cross beam attachment means preferably by cross beam fastening means 75, although once again other methods of securing could be utilized. Although the insulated cross beam could be completely planar, it is shown as being shaped more like a C-channel, with a cross beam top surface 76, a cross beam bottom surface 77 and a cross beam intermediate surface 78 which extends between the cross beam top and bottom surfaces 76 and 77 respectively, with the cross beam attachment means being secured to the intermediate surface 78.

Also secured to the insulated cross beam 70 are a plurality of conductive plates 80, with each of these buss plates 80 being secured to the cross beam 70 by conductive plate attachment means 82. The conductive plates preferably are fabricated from copper and are of the type of conductive plates well known in the electrical cabinet art. Also, the conductive plate attachment means 82 are preferably fabricated from Glastic®, a product of Glastic Corp. for electrical insulating boards for use in connection with electrical control panels, transformer spacer sticks and support insulation of various types and sizes.

The conductive plate attachment means has a first portion 83 shown for example as being a planar rectangular plate that is secured to the cross beam 70, and a second portion 84 shown for example as being a planar trapezoidal plate that is secured to the conductive plate 80, with the securing being effectuated by conductive plate fastening means 85, shown for purposes of illustration as cooperating threaded bolts and nuts. The first portion 83 has a top 83a and a bottom 83b. The second portion 84 has an upper beveled portion 84a, a lower beveled portion 84b, and an intermediate portion 84c between the two beveled portions. Optimally, a conductive plate attachment means is attached on both sides of each conductive plate.

Each conductive plate typically of a rectangular shape has a conductive plate top 86 and a conductive plate bottom 87. Additionally, each conductive plate has conductive plate sidewalls 88 and 89, with each plate 80 having conductive plate sidewall apertures 90, a conductive plate front edge 92, and a conductive plate rear edge 94. Each conductive plate attachment means second portion 84 also has at least one conductive plate attachment means aperture 95. Each conductive plate attachment means first portion has a first surface 96 that faces the front of the cabinet and a conductive plate attachment means first portion second surface 97 that faces the rear wall 18. Each first portion of also has a conductive plate attachment means first surface sidewall 98. Each conductive plate attachment means 82 also has a second portion first surface 100 and a second portion second surface 101 directly adjacent a conductive plate 80.

Attached to each conductive plate or plates (if two plates are placed immediately adjacent one another) at the top and bottom respectively are a plurality of compression lugs 105 of the type well known in the art, with these lugs being secured to the plates by compression lug fastening means such as bolts and nuts. Each lug permits a cable of the wind turbine to be secured therein, thereby creating a circuit that includes the conductive plates along with the cables above and below each cabinet.

As can be best appreciated from a comparison of FIGS. 3 and 4, a bottom member 110 forms the bottom wall of the cabinet 10. This bottom member 110 has an upper surface 112, a lower surface 114, and sidewall 116 with sidewall apertures 118 to permit attachment to the sidewall of the cabinet by fastening means 69. The bottom member 110 has a plurality of apertures formed therein that correspond to the apertures in the top of the cabinet, with PGs being secured at each such aperture as can be seen in FIG. 3

In actual use, the cabinet is assembled inside the wind turbine tower at a predetermined floor location. It may be necessary for a cabinet to be assembled for each floor inside the tower, such that several of the cabinets of this invention may be located inside a single wind turbine tower. The sidewalls of the cabinet are secured to the interior wall of the tower preferably by attachment to a bracket that is secured directly to the wall of the tower. Cables C are passed through the top and bottom of the cabinet and secured to the appropriate compression lug associated with the appropriate conductive plate. As shown in the drawing figures, a plurality of sets of five cables C pass through the cabinet, with one set of three cables C being provided for the neutral ground. The door of the cabinet is then closed, resulting in the electrical circuit connections being impossible for a worker to inadvertently come into contact with while inside the tower.

A key aspect of this invention is that the cabinet provides a better way to join the wire cables used in wind turbines, so that the degradation of the electrical circuits inside the tower of the wind turbine is significantly lessened. The presence of the conductive plates allows heat to be dissipated as well as providing for offsetting any bad connection that may exist within any cabinet by allowing the equalizing of current downline.

Another key aspect of this invention is that the cabinet keeps persons inside the tower of the wind turbine safer when they are around the wire cables, given the current flowing therethrough.

Still another key aspect of this invention is that the cabinet is relatively easy to install in existing wind turbine towers so as to retrofit the tower, thereby resulting in decreased electrical circuit degradation while at the same time resulting in enhanced safety.

Other key aspects of this invention concern the inclusion of the optional buss bar cover and the deadfront panel, one or both of which can be used with the termination enclosure.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A wind turbine wiring enclosure cabinet for connecting cables within the wind turbine, comprising:
    a housing having a top surface, a sidewall in contact with said top surface, said top surface having a plurality of apertures formed therein, said housing having an interior, said sidewall having a door accessing said interior, and
    an electrical circuit connector including at least one non-conductive beam, a plurality of conductive elements each having a top portion and a bottom portion, each being connectable to a corresponding one of the cables, said non-conductive beam being attached to said sidewall, said plurality of conductive elements being attached to said non-conductive beam.

2. The wind turbine wiring enclosure cabinet according to claim 1 wherein said conductive elements are attached to said non-conductive beam by non-conductive attachment means.

3. The wind turbine wiring enclosure cabinet according to claim 2 wherein each said non-conductive attachment means has a first portion in contact with at least one non-conductive beam and a second portion in contact with at least one of said conductive elements.

4. The wind turbine wiring enclosure cabinet according to claim 1 wherein said apertures formed in said top surface are arranged in a plurality of groups.

5. The wind turbine wiring enclosure cabinet according to claim 1 wherein said housing includes a bottom member, said bottom member attached to said housing sidewall, said bottom member having a plurality of apertures formed therein, said bottom member being located below said electrical circuit connector.

6. The wind turbine wiring enclosure cabinet according to claim 5 wherein said apertures formed in said bottom member are arranged in a plurality of groups.

7. The wind turbine wiring enclosure cabinet according to claim 1 wherein each aperture in said top surface has associated therewith and in contacting relationship thereto a plastic grommet.

8. The wind turbine wiring enclosure cabinet according to claim 5 wherein each aperture in said bottom member has associated therewith and in contacting relationship thereto a plastic grommet.

9. The wind turbine wiring enclosure cabinet according to claim 1 wherein said electrical circuit connector includes two non-conductive beams.

10. The wind turbine wiring enclosure cabinet according to claim 1 wherein each said non-conductive beam has two ends, each of said ends being attached to said housing sidewall.

11. The wind turbine wiring enclosure cabinet according to claim 1 wherein said housing has a rear sidewall portion, said electrical circuit connector being located in said interior of said housing intermediate said rear sidewall portion and said door.

12. A wind turbine wiring enclosure cabinet comprising
    a housing having a top surface, a sidewall in contact with said top surface, said top surface having a plurality of apertures formed therein, said housing having an interior, said sidewall having a door accessing said interior, and
    an electrical circuit connector including at least two non-conductive beams, a plurality of conductive elements each having a top portion and a bottom portion, each said top portion having connected thereto at least one electrical connector, each said bottom portion having connected thereto at least another electrical connector, said non-conductive beams being attached to said sidewall, each of said plurality of conductive elements attached to at least two of said non-conductive beams.

13. The wind turbine wiring enclosure cabinet according to claim 12 wherein said conductive elements are attached to at least one of said non-conductive beams by non-conductive attachment means.

14. The wind turbine wiring enclosure cabinet according to claim 13 wherein each said non-conductive attachment means includes a first portion in contact with at least one non-conductive beam and a second portion in contact with at least one of said conductive elements.

15. The wind turbine wiring enclosure cabinet according to claim 12 wherein said housing includes a bottom member, said bottom member attached to said housing sidewall, said bottom member being located below said electrical circuit connector, said apertures formed in said top surface are arranged in a plurality of groups and said bottom member having a plurality of apertures formed therein, said apertures formed in said bottom member are arranged in a plurality of groups.

16. The wind turbine wiring enclosure cabinet according to claim 12 wherein each said non-conductive beam has two ends, each of said ends being attached to said housing sidewall.

17. The wind turbine wiring enclosure cabinet according to claim 12 wherein said housing has a rear sidewall portion, said electrical circuit connector being located in said interior of said housing intermediate said rear sidewall portion and said door.

18. A wind turbine wiring enclosure cabinet comprising
a housing having a top surface, a sidewall in contact with said top surface, said sidewall having a pair of opposed surfaces, said sidewall having a rear wall section intermediate said pair of opposed surfaces, said top surface having a plurality of apertures formed therein, said housing having an interior, said sidewall having a door accessing said interior, and
an electrical circuit connector including at least one non-conductive beam, a plurality of conductive elements each having a top portion and a bottom portion, each said top portion being configured to connect to at least one electrical connector, each said bottom portion being configured to connect to at least another electrical connector, said non-conductive beam having a first end portion and a second end portion, said first end portion being attached to one of said opposed surfaces of said sidewall and said second end portion being attached to the other of said opposed surfaces of said sidewall, each of said plurality of conductive elements being attached to at least one non-conductive beam.

19. The wind turbine wiring enclosure cabinet according to claim 18 wherein said conductive elements are attached to said non-conductive beam by non-conductive attachment means.

20. The wind turbine wiring enclosure cabinet according to claim 18 wherein said electrical circuit connector has at least two non-conductive beams.

\* \* \* \* \*